Aug. 28, 1934.  A. J. BORST, JR  1,971,676
SHACKLE SHOCK ABSORBER FOR AUTOMOBILES
Original Filed Sept. 27, 1928
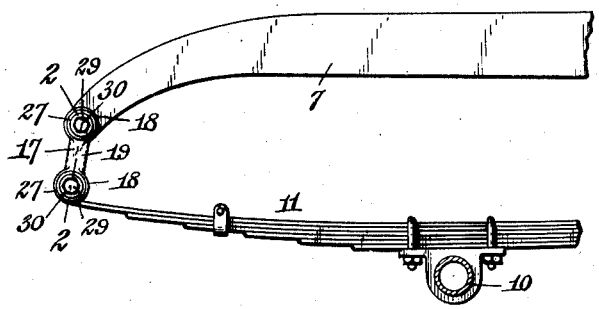
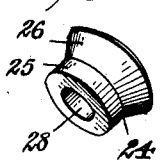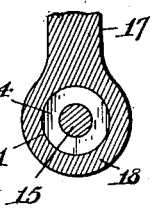
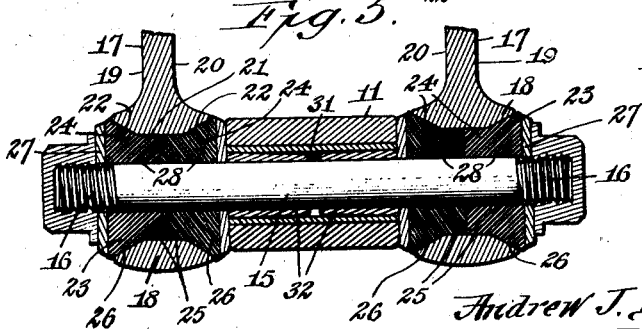
Andrew J. Borst, Jr., Inventor.
By Emil Kunkart, Attorney.
Witness:
J. J. Oberst.

Patented Aug. 28, 1934

1,971,676

UNITED STATES PATENT OFFICE 1,971,676

SHACKLE SHOCK ABSORBER FOR AUTOMOBILES

Andrew J. Borst, Jr., Buffalo, N. Y.

Application September 27, 1928, Serial No. 308,603
Renewed January 27, 1934

21 Claims. (Cl. 267—54)

My invention relates to improvements in shock absorbers embodied in the construction of shackles for automobiles, or the like, such as are used for connecting the springs to the chassis or other spring-mounted part of an automobile.

To absorb shocks with a view of having the body of an automobile ride easier, automobiles are now invariably equipped with shock absorbers, usually disposed at points between the spring-mountings on the axles and the shackles and these have a neutral point under action where they fail to operate effectively, this occurring when the automobile passes over cobblestone, or rough brick pavements, or over corduroy roads.

Shackles as now used in automobiles require constant lubrication, and even though lubricated become worn so that a certain degree of side slip of the spring takes place, which may be more particularly described as movements of the spring sidewise against the hanger members of the shackle; resulting in considerable noise, particularly when driving over rough roads.

Shackles are invariably constructed of all metal parts, which bear one against the other, and although bronze bushings are used through which the shackle bolts are passed, these bushings become quickly worn into oval formation so that the bolts move upwardly and downwardly therein in irregular fashion, and cause wabbling motion and considerable noise.

In automoboiles as now constructed, the body develops noises which are carried through the chassis and through the metallic connections between the chassis and the springs, and these appear to be greatly amplified when transmitted to the ears of the occupants of the automobile, especially when within an enclosed body. Furthermore, parts on the axles, spring clips, parts carried by the chassis, such as brake rods and the like, often become loose and noisy, and the rattling, hammering noises caused thereby are carried along through the all-metallic parts of the shackle between the springs and the chassis, and are considerably intensified and when heard within the closed body of an automobile, are extremely annoying.

The primary object of my invention is the provision of a shock-absorbing shackle for automobiles and the like.

Another object of this invention is to provide shock-absorbing connecting means between the springs of an automobile and the parts carried thereby.

Another object is, to provide shock-absorbing means at the outer ends of automobile springs where they are most flexible and sensitive to slight shocks not transmitted to the stiffer or less yielding portions of the springs.

Another object of my invention is the provision of shock-absorbing means within the eyes of the shackle bars or hanger of shackle connections.

Another object is to provide a shackle for automobile springs wherby the above-mentioned objections are completely eliminated; this being accomplished by insulating the connection of the springs to the chassis or other rigid part of the body, or to a part secured to and movable with the body, by means of my shock-absorbing shackle, whereby body noises are completely insulated and the rattling noises caused by loose parts arranged at various places on the automobile are deadened at the shackles and prevented from being carried through the body and chassis or frame structure.

Another object of my invention is to utilize the yielding elements of my shock-absorbing shackles as yielding thrust bearings for the eyes of the spring and chassis, and as part of the means to connect the springs to the chassis.

Another object of my invention is to provide a shackle which in addition to serving as a shock absorber, is so constructed that all wear is outside of the region of the spring or chassis portion to which the shackle members are secured; and more particularly stated, in which the wear is within the shackle suspension at opposite ends of the eyes formed in the springs and chassis.

Another object of my invention is to provide a shackle in which the shackle bolts retain a solid bearing along the entire length of the eyes of the spring and the chassis, and in which provision is made to prevent the shackle bolts causing wear within the eyes of such parts.

Another object of my invention is to so construct the shackle suspension that side rocking of the body is prevented and so that the movement of the body is at all times perpendicular.

A further object of my invention is to provide a shackle in which the shackle bolts are in contact with and solidly held in metallic portions of the eyes of the spring and the chassis, and wherein all yielding parts are arranged at opposite ends of said eyes.

A still further object of my invention is to provide a shackle which can be applied to used automobiles having the eyes of the springs and chassis worn, and wherein the advantages above referred to are all obtained by boring out the worn eyes, usually of substantially oval formation, and forming them into cylindrical shape. When so prepared, suitable adapters are used within the eyes to assure solid bearings for the shackle bolts.

A still further object of my invention is to provide, in the construction of shackles, yielding elements compressible in certain directions and expansible in other directions so as to take up wear; this being preferably accomplished without disassembling any of the parts.

With the above and other objects in view to appear hereinafter, the invention consists in the novel features of construction, and in the arrangement and combination of parts to be hereinafter described and more particularly pointed out in the subjoined claims.

In the drawing:—

Fig. 1 is a side elevation of a portion of an automobile chassis and a portion of the usual axle-mounting spring connected to the chassis by means of my improved shackle shock-absorber.

Fig. 2 is an enlarged cross section taken on line 2—2, Fig. 1.

Fig. 3 is a detached perspective view of one of the insulating and cushioning elements employed in the construction of my improved shackle shock-absorber.

Fig. 4 is a vertical section taken on line 4—4, Fig. 2.

Fig. 5 is a section similar to Fig. 2, showing the lower end of a shackle shock-absorber constructed in accordance with this invention but adapted for use in automobiles having had other shackle suspensions applied thereto and having caused wear of the eyes of the spring and chassis; suitable adapters being here shown for the purpose of so applying my invention.

Fig. 6 is a detached perspective view of one of the adapters used in the construction shown in Fig. 5.

In the drawing, the numeral 7 designates one of the side parts or members of an automobile chassis having at its rear or front end, as the case may be, an eye 8 of conventional form in which a bronze or other suitable bushing 9 is fitted.

10 designates one of the axles of an automobile to which is connected the usual spring 11, the longest leaf of which has at one of its ends, the conventional eye 12, one of which only is shown in the drawing. This eye is also provided with the usual bronze or other bushing 13.

Due to the construction of my invention and the manner of absorbing shocks and jars, the shackle bolts may be secured within unbushed eyes, if desired. These bolts are designated by the numerals 14, 15, and may be firmly secured within the eyes, or the bushings of the eyes where such are used, in any approved manner.

Where, herein reference is made to the eyes of the chassis, or springs, this term is to be construed to include a bushed or unbushed eye, by which terms I have reference, respectively, to an eye having a bushing and an eye without a bushing.

In the construction herein shown the shackle bolts 14, 15 are driven, respectively, into one of the eyes of the chassis and one of the eyes of an automobile spring, so that they are firmly retained therein against longitudinal movement and also against rotation, and they are so applied to these parts that they have opposite end portions projecting from the eyes. These projecting end portions are yieldingly connected and the extremities thereof are screw-threaded, as at 16. These shackle bolts serve therefore to provide projections at opposite sides of the spring and at opposite sides of one of the members of the chassis. Manifestly, these projections may be provided for the chassis and springs in a manner other than herein shown and described.

Shackle bars or hangers 17 connect the projections at opposite sides of the spring and the chassis together, and these bars or hangers have apertured enlargements 18 at opposite ends, in the form of eyes; these eyes being joined together by a member integral therewith, and preferably oblong in cross section to provide flat or comparatively flat outer and inner faces 19, 20, thus considerably reducing the weight of the shackle bars or hangers and giving them a finished appearance. In preferred construction, each of the apertured enlargements or eyes 18 has a medial cylindrical portion 21 and opposite flaring end portions 22.

Fitted within each of the eyes of each shackle bar or hanger is a shock absorbing element 23, which also serves as an insulating element, so termed because it absorbs shocks imparted either to the springs or to the body through the medium of the springs, or otherwise, and for the reason that it insulates noise of, or noise imparted to, the chassis from the springs, and reversely from the springs to the chassis. As there are two pairs of shock absorbing and insulating elements employed in each shackle of an automobile, both gentle and violent depressions and recoveries or rebounds of the springs will be cushioned at opposite sides of the springs and chassis members, and all noise usually carried into the body of an automobile from the springs, or from points beyond the springs and through the latter, is doubly insulated from the body; both the lower and upper shock absorbing and insulating elements of the shackle serving to deaden the noise and prevent its being carried upwardly into the body through parts supported by the springs. Each of these elements, which may hereafter be referred to under one of these functional terms (viz. as a shock absorbing, a cushioning, or an insulating element or member), is formed of two parts 24 constructed as particularly shown in Fig. 3, each part having an inner cylindrical portion 25 and an outer flaring portion 26, and the parts of each of such element or member are inserted into an eye 18 from opposite ends thereof.

Normally, the cylindrical inner portion 25 of each part of a shock absorbing and insulating element is somewhat longer than one-half the length of the cylindrical portion 21 of the eye, and the flared outer portion of each part is somewhat longer than each of the flared outer portions of each of said eyes so that when the two parts are inserted into the eye and abut end to end, each shock absorbing and insulating element so formed projects somewhat from opposite ends of an eye into which it is inserted. These parts of the shock absorbing and insulating elements are of a size to fit snugly into the eyes of the shackle bars or hangers, and for convenience of description, the flared portions of these elements are to be considered the outer ends thereof.

The two parts 24 of each shock absorbing and insulating element are preferably formed of rubber composition with a percentage of graphite embodied in the composition, for a purpose to appear hereinafter. To the outer end face of each of these parts, a wearing element 27, preferably in the form of a fiber washer, is vulcanized, and each of these parts has an axial opening 28 therethrough, which opening conforms in size to that in said fiber washer and to the diameter of the projecting end portions of the shackle bolts.

When the parts of the shock absorbing and insulating elements are inserted into the eyes of the shackle bars or hangers, these bars or hangers are forced onto the inner and outer projecting ends of the shackle bolts, the shock absorbing and insulating elements fitting snugly onto said projecting ends. When properly positioned on the bolts, the outer end of the inner part of each shock absorbing and insulating element, or the inner end of said element, considering said parts as a unit, bear firmly against the ends of the eyes formed in the members of the chassis and in the spring, as clearly shown in Fig. 2.

Nuts 29 are applied to the threaded extremities of the projecting end portions of the shackle bolts, and these nuts are preferably flanged at their inner ends, as at 30, to provide extended bearing surfaces for contact with the outer ends of said shock absorbing and insulating elements or, more particularly stated, against the fiber or other wearing elements vulcanized or otherwise arranged against the rubber composition portion of said shock absorbing or insulating elements. The nuts, therefore, have a firm bearing and when being tightened, cannot grind into and cause abrasion of the rubber composition.

By tightening the nuts 29 onto the threaded extremities of the shackle bolts, the inner part of each shock absorbing and insulating element is compressed against the adjacent end of the eye of the chassis or spring with which it cooperates, and at the same time the outer part of such element is forced inwardly under pressure against the inner part. Under such conditions, the rubber portions of each of the parts of such elements are compressed longitudinally along the region directly surrounding the shackle bolt and firmly against the latter and the outer portions are caused to expand against both the cylindrical portion and the flaring portions of the eyes formed in the shackle bars or hangers; thus preventing rotation of said elements on the shackle bolts, but permitting oscillating movement of the shackle bars or hangers 17, under friction, on the shock absorbing and insulating elements mounted on the projecting ends of the shackle bolts, which oscillation is sufficient for deflection of the spring under all riding conditions.

Due to the fact that the rubber has in its composition, the necessary quantity of graphite or other lubricant, lubrication of the relatively movable parts of this device is absolutely unnecessary. The relative movement of the parts are slight and by use of graphite within the composition from which the shock absorbing and insulating elements are formed, the device is self-lubricating to the extent necessary for all practical purposes.

The rubber or composition elements 23, serve as shock absorbers and although the rubber or composition shock absorbing and insulating elements are confined under pressure, they yield to absorb the slight oscillations of the parts as well as severe shocks and jolts caused by passing over bumps or obstructions or into depressions in the road; thus serving in a highly efficient manner all purposes of the well known shock absorbers now in use and in addition absorbing the slight vibrations caused when passing over brick or cobblestone pavements, which ordinarily shock absorbers fail to eliminate, due to the fact that all shock absorbers are effective only in absorbing the heavier or more pronounced shocks or bumps imparted to the vehicle, and have what is generally termed a neutral or ineffective point during which they are insensitive to the slighter jars.

The use of the wearing elements at opposite ends of each shock absorbing and insulating element will guard against wear at the ends of said last-mentioned elements. Swaying of the automobile body laterally is absolutely prevented, and only perpendicular movement of the body can take place, due to the fact that opposite ends of the shock absorbing and insulating elements have bearing against non-yielding parts of dimensions to practically cover the opposite ends of said elements and also due to the fact that the said elements are firmly compressed upon the shackle bolts and expanded against the walls of the eyes of the spring and chassis.

Due to the construction shown and described, no wear occurs within the springs or the frame, as wear, if any, taking place, must occur at opposite ends of the eyes through which the shackle bolts are passed, and such wear can be quickly and completely taken up by tightening the nuts applied to the ends of said bolts, without in any manner effecting the shock-absorbing qualities of the device.

It will be apparent that by using this device on an automobile, shock absorbers are provided at the extremities of the springs, and more specifically stated, at the eyes of the springs where they are more effective, and more sensitive than under known conditions of use, under which connection is made with the springs, some distance from the ends thereof; also that this device eliminates all rattles, spring slaps, so termed due to the side swaying of the shackle bars or hangers as ordinarily used, which creates considerable noise; and by dividing the shock absorbing and insulating elements, which may be described as being spool-shaped, any wear or slackness occurring under use can be adjusted separately at each end of a shackle bolt, and it also permits ready and quick assembling of the shackle bars or hangers.

By completely facing or covering the ends of the rubber or composition elements of the device with fiber or other wearing elements, cutting of such rubber or composition elements at their outer edges under pressure of the nuts is fully avoided.

In the modification shown in Figs. 5 and 6 I have illustrated the method of using my invention on automobiles, whether new or used, originally equipped with the standard type of shackles. Some types of new automobiles so equipped require no alteration in the construction of the eyes formed in the chassis members and the springs, due to the fact that the bushings of the eyes are of somewhat larger diameter than the shackle bolts of my invention. Other types of new automobiles equipped with standard types of shackles necessitate drilling the eyes through the chassis members and springs to a larger diameter, and in such cases they are bushed with a bronze or other suitable sleeve bushing.

In automobiles shackle-equipped in the customary way, the eyes in the springs and chassis members become worn unevenly after a period of time and in order to apply my invention to such automobiles, these eyes are drilled to true cylindrical form, and may or may not be bushed with a bronze or other suitable bushing, as for example designated by the numeral 31 in Fig. 5. When bushings are employed, each is of a size that its internal diameter is somewhat larger than the shackle bolts 15 passed therethrough, and this bolt is held axially within the bushing, or the eye of the chassis member or spring when no bushing is employed, in a firm manner by means of slightly tapered centering and securing nipples 32, which may be termed adapters and which are passed over the shackle bolt from opposite ends, and driven into the bushing or eye from opposite sides thereof. These adapters are slit or slotted lengthwise, as shown at 33, in Fig. 6, and they are slightly roughened along a portion of their length from their inner ends outwardly, as at 34; the roughened surface thus provided being formed by fine circumferential corrugations, or otherwise.

The material from which these adapters or centering and retaining nipples is constructed, is comparatively soft so that in driving the nipples into an eye they become firmly seated therein and are clamped around the shackle bolts so as to prevent lengthwise and rotative movement of the bolt within the eye. In driving the nipples into the eyes, the effect of the harder metal of the bushing of the eye, or the metal of the chassis member or spring, in the event that no bushing is used, will be such that the surface metal of the nipples will be sheared from the latter, due to the necessity of driving these nipples into the eye to centrally position and firmly clamp the bolt and simultaneously therewith firmly retain the nipples within the eye.

It will be apparent that under either the preferred construction illustrated in Fig. 2, or the modified construction illustrated in Fig. 5, the shackle bolt will be firmly held within the eye of a chassis member or spring, without possibility of rotating therein or moving lengthwise, and the bolt thus has a solid bearing throughout the entire length of the eye.

Due to the fact that the shock absorbing and insulating elements 23 are mounted on the projecting ends of the shackle bolts and confined within the shackle bars or hangers 17, all movements relatively of the parts of the shackle construction are confined to that area fully within the eyes of the shackle bars or hangers.

In consequence of the parts of the shock absorbing and insulating elements being compressed within the eyes of the shackle bars or hangers, side rocking movement of the body of the automobile is prevented, and all movement is confined strictly to the perpendicular plane in which the springs are flexed. Furthermore, by reason of the fact that the pressure on the parts of the shock absorbing and insulating elements may be regulated in the direction of the length of the shackle bolts, the tendency of these elements to cut through in a radial line under the weight of the car, is positively eliminated.

This invention embodies the principle of connecting shackle bars or members to free-ended or free-supported cushioning elements, so termed for the reason that they are unconfined at any portion thereof, and serve as supports for the elements connecting the shackle bolts together; providing what may be termed floating supports for the shackle bars or members.

While retaining these and other advantages of my invention, the construction may be further modified without departing from the spirit of my invention, or sacrificing any of the advantages thereof.

Having thus described my invention, what I claim is:—

1. The combination with a chassis member and a spring, each having an eye spaced one from the other, of a shackle bolt passing through each of said eyes, shackle hangers having eyes therein, and shock-absorbing elements within said eyes through which and in circular contact with which said shackle bolts are arranged, said shock absorbing elements extending beyond the outer and inner ends of said eyes and being compressed longitudinally along the region directly surrounding said shackle bolts and the outer portions thereof expanded against the surrounding walls of said eyes.

2. In an automobile, a shackle adapted to flexibly connect together two parts provided with eyes, said shackle comprising two members lying at opposite sides of said parts and spanning the distance between the eyes thereof, and connection between said parts and said members comprising bolts extending through said eyes and yielding elements extending through said members and surrounding said bolts, said bolts fitting snugly in said yielding elements and the latter extending onto the outer and inner ends of said eyes and being compressed longitudinally along the region directly surrounding said shackle bolts, and the outer portions thereof being expanded against the surrounding walls of said eyes.

3. In an automobile, a shackle adapted to flexibly connect together two parts provided with eyes, said shackle comprising two members disposed at opposite sides of said parts and provided with eyes coincident with the eyes of said parts, shackle bolts immovably fitted into the eyes of said parts and extending from opposite ends thereof, cushioning elements fitted into the eyes of said shackle members and surrounding the projecting ends of said bolts, and means to apply pressure to said cushioning elements to force the same against the ends of the eyes of said parts, to compress the same against the parts of said shackle bolts which they surround so as to prevent rotative movement relatively of said bolts and cushioning elements, and to expand the same against the walls of the eyes in said shackle members, yet allow rotative movement relatively of said eyes and cushioning element.

4. A shackle construction for automobiles, comprising spaced parallel shackle bolts immovably fastened into two relatively movable automobile parts and having opoosite ends of said bolts projecting from said parts, rigid shackle members connecting corresponding ends of said bolts, each shackle member having yielding elements therein surrounding said bolts and in contact therewith, and means for retaining said rigid shackle members on said bolts in a manner to prevent relative rotative movement of said yielding elements and bolts but permit relative rotative movement of said shackle members and yielding elements.

5. A shackle construction for automobiles, comprising spaced parallel shackle bolts immovably fastened into two relatively movable automobile parts and having opposite ends of said bolts projecting from said parts, rigid shackle members connecting corresponding ends of said bolts, said shackle members having cushioning elements therein surrounding said bolts and in contact therewith, and means for retaining said rigid shackle members on said bolts and compressing said cushioning elements thereon to prevent relative rotative movement of said bolts and cushioning elements but permit relative rotative movement of said shackle members and said cushioning elements 6. A shackle construction, comprising two parallel spaced bolts applied to two relatively movable parts and having opposite ends thereof projecting from said parts, rigid elements connecting coresponding ends of said bolts at opposite sides of said parts, said rigid connecting elements having eyes at opposite ends provided with shock-absorbing elements through which the corresponding ends of said bolts are passed, said shock-absorbing elements being longitudinally compressible wholly within said eyes, and means for securing said rigid elements to said bolts to prevent rotation relatively of said bolts and cushioning elements while compressing said cushioning elements longitudinally.

7. A shackle construction, comprising two relatively movable parts having immovable projections at opposite sides of said parts, rigid elements connecting corresponding ends of said projections at opposite sides of said parts, said rigid connecting elements having eyes at opposite ends provided with cushioning elements through which said bolts are passed, said cushioning elements being compressible onto said bolts, and means for fastening said rigid elements to said bolts and compressing said cushioning elements against said bolts to prevent relative rotative movement of said cushioning elements and bolts.

8. A shackle construction, comprising two parallel spaced bolts applied to two relatively movable parts and having opposite ends thereof projecting from said parts and the extremities thereof screw-threaded, rigid elements connecting corresponding ends of said bolts at opposite sides of said parts, said rigid connecting elements having eyes at opposite ends provided with cuschioning elements into which the corresponding ends of said bolts project so as to expose the screw-threaded ends thereof, said cushioning elements being compressible lengthwise along the bolts with component compression inwardly against the bolts to prevent rotation of said cushioning elements on said bolts and having component expansive movement outwardly against the walls of the eyes of said rigid elements, yet permit oscillatory movement of said rigid connecting elements on said cushioning elements and nuts threaded onto the screw-threaded ends of said bolts for causing the stated compression and expansion action of said cushioning elements and for securing said rigid elements to said bolts.

9. A shackle construction adapted to connect two relatively movable parts of an automobile together, comprising elements projecting from opposite sides of each of said parts, shackle bars provided with eyes at opposite ends through which said projecting elements are passed, said projecting elements having screw-threaded extremities extending outwardly beyond said shackle bars, means within the eyes of said shackle bars fitted firmly onto said projecting elements and being wholly within said eyes to prevent rotation of said means on said bolts and for cushioning the action imparted to one of said relatively movable parts, and nuts applied to the screw-threaded extremities of said projecting elements and exerting force directly against said cushioning means 10. A shackle construction for connecting two relatively movable parts of an automobile provided with eyes trending in like directions, shackle bolts immovably positioned in said eyes and projecting from opposite ends thereof, shackle bars connecting the projecting ends of said bolts together, each of said shackle bars having at least at one of its ends an eye, and a yielding element fitted into said last-mentioned eye into which one of said shackle bolts is entered, said yielding element being compressed over the projecting portions of said shackle bolts to prevent rotation thereof on said shackle bolts.

11. A shackle construction for connecting two relatively movable parts of an automobile together, comprising shackle bolts immovably disposed within said parts and projecting therefrom at opposite ends, shackle bars connecting corresponding ends of said shackle bolts, and cushioning means compressed within said shackle bars to prevent side swaying of one of said parts, said cushioning means being secured to said shackle bolts under such compression to prevent rotative movement of the cushioning means on said bolts.

12. A shackle construction for connecting two relatively movable parts of an automobile together, comprising shackle bolts immovably disposed within said parts and projecting therefrom at opposite ends, shackle bars connecting corresponding ends of said shackle bolts, and means embodied in the construction of said shackle bars to confine the relative movements of said parts to movement at right angles to said shackle bolts and to prevent relative rotative movement of said means with respect to said shackle bolts.

13. A shackle construction for connecting two relatively movable parts of an automobile together having eyes extending from one side to the other of said parts, comprisig two shackle bolts extending through said eyes and projecting from opposite sides thereof, a split tapered adapter driven into each of said eyes around the bolt there'n to immovably hold said bolt within its eye and to center said bolt within said eye, and shackle bars connecting the projecting ends of said bolts.

14. A shackle construction for connecting two relatively movable parts of an automobile together having eyes extending from one side to the other of said parts, comprising two shackle bolts extending through said eyes and projecting from opposite sides thereof, split tapered adapters driven into each of said eyes from opposite ends thereof to fasten said shackle bolts axially within said eyes and to center said bolts within said eyes, and shackle bars connecting the projecting ends of said shackle bolts together.

15. Means for fastening shackle bolts within eyes of two relatively movable parts of an automobile, comprising tapered adapters of softer material than the material of said parts, said nipples being driven into said eyes from opposite ends thereof so as to firmly bear against the walls of said eyes and against said bolts, thereby axially fastening said bolts within said eyes against movement rotatively and lengthwise.

16. A shackle construction for connecting two relatively movable parts of an automobile together, comprising parts projecting from opposite sides of said relatively movable parts, rigid shackle members connecting said projecting parts together, each of said shackle members having an eye at one end provided with a cylindrical intermediate portion and opposite flaring end portions and through which one of said projecting parts is passed, a yielding element entered into the eye of each shackle member and formed of two parts constructed to conform to substantially one-half the length of the eye in which it is inserted, said two parts being inserted from opposite ends of said eye and fitted onto one of said projecting parts, and means for fastening said shackle members to said relatively movable parts and for compressing said yielding elements within said eyes and onto said projecting parts.

17. In a shackle construction, a shackle bolt having a threaded extremity, a shackle member provided with an eye through which said bolt axially extends, said eye having a cylindrical intermediate portion and opposite flaring end portions, a cushioning member somewhat longer than said eye divided transversely to form two parts, each having a cylindrical inner portion and a flaring outer portion, said parts being inserted into said eye from opposite ends thereof with the cylindrical inner portions abutting against each other, and a nut threaded onto the threaded extremity of said bolt.

18. A shackle construction for connecting two relatively movable parts having spaced eyes, comprising shackle bolts rigidly held within said eyes and having opposite ends thereof projecting from opposite ends of said eyes, said shackle bolts having their extremities screw-threaded, shackle members connecting the corresponding projecting ends of said shackle bolts together, each shackle member having an eye at each end and each eye having a cylindrical intermediate portion and flaring outer end portions, a yielding member fitting into each eye and onto the projecting end of the shackle bolt extending through said eye, each of said yielding members being formed in two parts and each of said parts having a cylindrical inner portion and a flaring outer portion, said parts being inserted into said eye from opposite ends thereof with the inner cylindrical portions abutting and the outer extremities of said outer flaring portions projecting outwardly from said eye, and nuts threaded onto the extremities of said bolts and bearing against the outer ends of said yielding members to force said yielding members against the ends of the eyes of said relatively movable parts, to cause said yielding members to expand against the walls of their retaining eyes, and to compress said yielding members onto said bolts.

19. A shackle construction for connecting two relatively movable parts of an automobile having eyes therein, comprising shackle bolts arranged within said eyes and projecting from opposite ends thereof, said shackle bolts having opposite extremities screw-threaded, shackle bars connecting corresponding projecting ends of said bolts, at least one end of each of said shackle bars having an eye formed therein, yielding elements in said eyes fitted onto the projecting ends of one of said bolts in a manner to prevent rotative movement of said yielding elements on said bolts and serving also as shock-absorbing and insulating means, said yielding elements being formed of rubber composition and having wearing disks applied to opposite ends thereof, the wearing disk at one end of each of said yielding elements bearing against the eye of one of said two relatively movable parts, and a nut threaded onto the screw-threaded extremities of said bolts, certain of said nuts bearing against the wearing disks at the other ends of said yielding members.

20. A shackle construction comprising two relatively movable parts having eyes therein, shackle bolts rigidly secured within said eyes and projecting from opposite ends thereof, said shackle bolts having screw-threaded extremities, shackle members connecting corresponding ends of said shackle bolts and having eyes at opposite ends thereof through which said bolts axially extend, each of said eyes having a cylindrical intermediate portion and opposite flaring end portions, yielding members within said eyes and through which the projecting portions of said bolts extend, each of said yielding members comprising two parts insertible into its retaining eye from opposite ends thereof, each of said parts comprising a cylindrical inner portion and a flaring outer portion extending outwardly beyond the corresponding end of said eye, the cylindrical inner end portions of said parts abutting within said eye, fiber wearing disks molded to the outer ends of said parts, the fiber disk of the inner part of each yielding element bearing against the end of an eye of one of said two relatively movable parts, and nuts threaded onto the screw-threaded extremities of said shackle bolts bearing against the fiber disks of the outer parts of said yielding elements.

21. A shackle bar for automobiles having an eye at each end formed to provide a central portion of symmetrical contour and flaring outer ends, and a correspondingly shaped rubber element fitted within said eye and provided with an axial opening, the rubber elements in each eye comprising two parts thrust into said eye from opposite ends.

ANDREW J. BORST, Jr.